Figure 1:
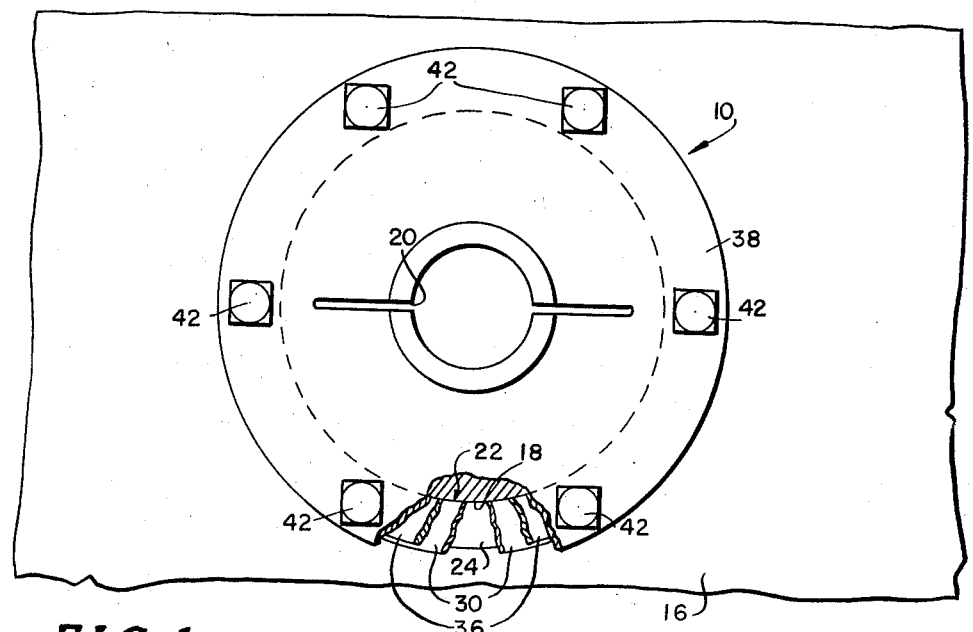

Aug. 4, 1959    J. J. SMITH    2,897,842
PIPE FITTING WITH RETAINED GASKET SEALING MEANS
Filed June 1, 1956

INVENTOR
JOHN J. SMITH

BY Cushman, Darby & Cushman
ATTORNEYS 2,897,842
Patented Aug. 4, 1959

2,897,842
PIPE FITTING WITH RETAINED GASKET SEALING MEANS

John J. Smith, Decatur, Ill., assignor to Mueller Co., Decatur, Ill., a corporation of Illinois Application June 1, 1956, Serial No. 588,700

6 Claims. (Cl. 138—92)

This invention relates to pipe connections and more particularly to a fitting having improved means thereon for effecting a pressure-tight seal between the fitting and a pipe or other conduit.

The present invention constitutes an improvement in the pipe connection and sealing means disclosed in Patent No. 2,199,647 to Mueller et al., dated May 7, 1940. In that patent a sealing member is disclosed for use with a fitting, which sealing member comprises a hollow ring-shaped carrier of deformable metal and a ring of compressible backing material in the carrier. The packing ring and carrier are of substantial uniform annular thickness or cross section and the packing ring is arranged to be compressed into pressure-tight sealing engagement with the convex exterior surface of the pipe with a maximum compression at opposed points extending longitudinally of the pipe and a minimum compression at opposed points extending laterally of the pipe. Thus, since uneven compression is applied to the packing ring, the seal is not as effective as it could be if a uniform pressure were applied.

There have been attempts to overcome this disadvantage in the sealing means of the patent. For example, Patent No. 2,481,481 to Smith, dated September 6, 1949, solves this problem by forming the packing ring and carrier with a concave pipe engaging surface so that a flat member on the flat upper end of the carrier will uniformly urge the packing ring into sealing engagement with the pipe. While this arrangement effects a uniform sealing compression of the packing ring, the construction of the packing ring is relatively expensive as compared with one which has a uniform annular thickness or cross section.

Accordingly, it is an object of the present invention to provide a fitting of the type described having improved means for applying a uniform compression to a sealing ring means of substantial uniform annular thickness or cross section so as to obtain the advantages of both of the arrangements indicated above, while eliminating the disadvantages inherent therein.

Another object of the present invention is the provision of a fitting having sealing ring means thereon suitable for forming a pressure-tight connection between the fitting and the pipe and improved means for applying pressure to the seal to move the same into engagement with the pipe so that the latter is uniformly compressed throughout its annular extent.

Still another object of the present invention is the provision of an improved means for applying a uniform pressure to a flat sealing ring means of uniform annular thickness or cross section so as to deform the same into conformity with the convex exterior surface of a pipe or the like.

A still further object of the present invention is the provision of a sealing ring pressure-applying means which is simple in construction, economical to manufacture and easy to operate.

These and other objects of the invention will become more apparent during the course of the following detailed description and appended claims.

The invention may best be understood with reference to the accompanying drawings wherein an illustrated embodiment is shown.

Figure 2:
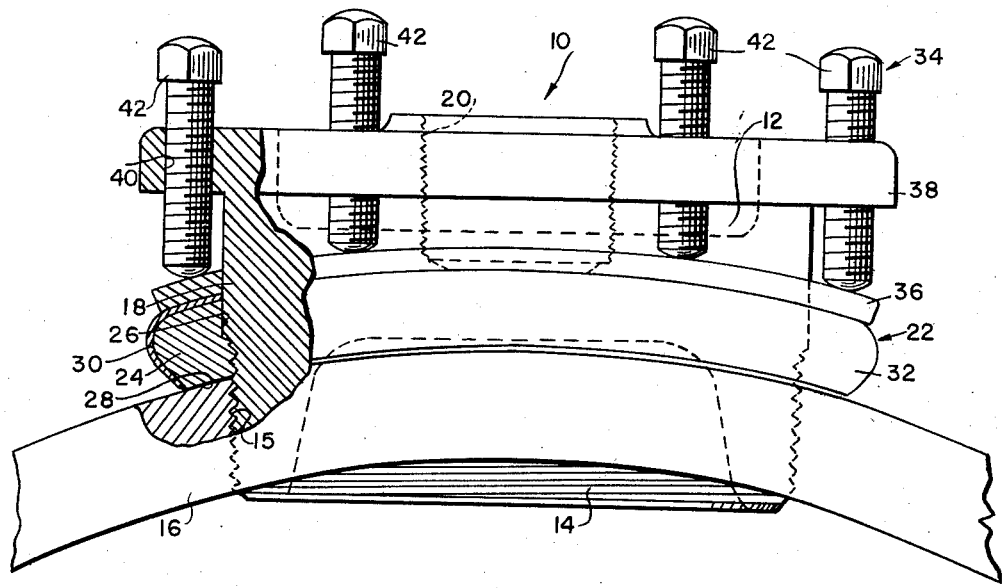

In the drawings:

Figure 1 is a top plan view, partly broken away, of a pipe having attached thereto a fitting embodying the principles of the present invention; and Figure 2 is a side elevational view of the structure shown in Figure 1 with parts broken away for purposes of clearer illustration.

As set forth in the aforementioned Mueller et al. patent, a sealing means of the type disclosed therein may be utilized with any type of fitting. For example, one of the principal uses of this type of sealing means is for installing a branch pipe from a main gas or water line, which branch pipe is to be controlled adjacent the main pipe by a valve known as a corporation cock. This type of seal has been effective in making connections with the thin wall steel pipes, although, obviously, it is not confined to conduit walls of any particular thickness or material. Obviously, the sealing means is effective to form a seal between a pipe and any other type of fitting.

In this regard, in the drawings, there is shown a plug fitting, generally indicated at 10. The plug 10 includes a body 12 having one end 14 externally threaded for engagement within a transversely extending aperture 15 formed in a pipe 16. Extending outwardly from the pipe 16 adjacent the end 14 is a cylindrical portion 18 which forms the middle of the body 12. At the end of the body opposite from the threaded end 14 there may be provided suitable socket connections 20 for receiving an appropriate tool to effect insertion and removal of the plug from within the pipe. It will be understood, however, that the fitting may be attached to the pipe by any suitable means other than by threaded connection, if desired.

Mounted on the cylindrical portion 18 of the body 12 is a sealing ring means, generally indicated at 22, of the type disclosed in the aforesaid Mueller et al. patent. This means may take the form of a ring 24 of compressible packing material having interior sealing surfaces 26 and 28 and an exterior annulus 30. A ring-shaped carrier 32 of a thin deformable metal surrounds the exterior annulus 30 of the packing ring and, hence, exposes the interior sealing surfaces 26 and 28. The sealing ring means 22 in its initial condition before being compressed into pressure-tight engagement with the pipe 16 is preferably in a flat condition and it will be noted that it has a substantially uniform annular thickness or a substantially uniform cross-sectional configuration.

In order to effect a uniform compression of the sealing ring means 22 into pressure-tight engagement between the fitting portion 18 and the convex exterior surface of the pipe 16, there is provided by the present invention a novel pressure-applying means, generally indicated at 34. Preferably, this means includes a follower ring 36 mounted on the cylindrical portion 18 of the fitting for free longitudinal movement. That is, the follower ring may have translational movement along the axis of the cylindrical portion and, in addition, it may be freely rotatable about the axis thereof. The follower ring is made out of a flexible material, preferably a suitable metal, although it will be understood that plastic and other materials which have suitable flexing characteristics may be employed.

Extending laterally outwardly from the end of the fitting body 12 opposite from the end 14 is an annular flange 38. This flange has a plurality of circumferentially spaced apertures 40 formed therein. It will be undestood that any suitable number of apertures may be employed and, as shown, there are six such apertures equally spaced circumferentially around the flange. Each of the apertures 40 is threaded to receive a longitudinally extending bolt 42. These bolts have their threaded ends arranged to engage the upper surface of the follower ring 36.

In operation, the fitting 10, before being attached to the pipe, has the flat sealing ring means 22 mounted on the cylindrical portion thereof in substantially abutting relation to the flange 38 with the bolts 42 fully retracted within the apertures 40. In this condition, the end 14 of the fitting is secured to the pipe 16 by engaging the threads in the suitably formed opening 15 in the pipe and then the same is tightened by means of a tool inserted in the sockets 20. After the fitting has been thus attached to the pipe, the pressure-applying means 34 may be actuated to move the sealing ring means 22 into conformed pressure-tight sealing engagement with the convex exterior surface of the pipe adjacent the fitting. This movement is effected by turning the bolts 42. It will be noted that the bolts disposed at opposed lateral points with respect to the pipe may be initially actuated to effect a flexing of the follower ring and deformation of the sealing ring means 22 so that the same will assume a curvature which conforms in shape generally to the shape of the convex exterior of the pipe. The remaining bolts may be turned to apply pressure to the follower ring and sealing ring means at points spaced intermediate the lateral extremities of the pipe and the longitudinal axis thereof. As shown in Figure 2, the series of bolts 42 may be turned to various depths so as to flex and move the follower ring 36 into engagement with the sealing ring means 22 and, hence, the sealing surface 28 of the packing ring thereof, into engagement with the exterior surface of the pipe. Since the follower ring is capable of flexing into a shape which substantially conforms with the shape of the convex exterior surface of the pipe, this engagement of the surface 28 with the pipe exterior can be accomplished by a substantially uniformly applied pressure throughout the entire annular extent of the packing ring. In this manner, an effective sealing engagement of the packing ring with the pipe is insured around the entire fitting. Moreover, the sealing ring means 22 does not have a substantially greater amount of pressure applied to any one portion thereof. It will be noted that in its operative position, the follower ring 36 provides a sealing ring means engaging concave surface which generally conforms in shape to the shape of the convex exterior surface of the pipe. The sealing ring means 22 therebetween is uniformly deformed and has its surface 28 in sealing contact with an even pressure throughout. Of course, the surface 26 forms a seal against the cylindrical portion of the fitting to complete the job.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a joint, a pipe having a convex cylindrical exterior surface, a fitting having a portion secured to and extending outwardly from said pipe, sealing ring means of substantially uniform annular cross-section mounted on said portion and having one surface for engagement with the convex exterior surface of the pipe adjacent said fitting portion, follower means mounted on said portion adjacent the opposite surface of said sealing ring means for translational movement along the longitudinal axis thereof, and means carried by said fitting for moving said follower means into operative engagement with the opposite surface of said sealing ring means and hence the one surface thereof into pressure-tight sealing engagement with the exterior surface of said pipe, said follower means in operative engagement presenting a concave sealing ring means engaging surface conforming in shape generally to the shape of the convex exterior surface of said pipe so as to apply a substantially uniform pressure to the sealing ring means of uniform annular cross-section therebetween.

2. In a joint of the type described, a cylindrical pipe having a transversely extending opening therein, a fitting having a portion secured in said pipe opening and extending outwardly therefrom, normally flat sealing ring means of substantially uniform annular cross-section mounted on said fitting and flexed into substantially uniform pressure-tight engagement with the convex exterior surface of said pipe surrounding said opening, a normally flat continuous ring of flexible material flexed into engagement with the surface of said sealing ring means remote from said pipe surface in substantially parallel relation to the latter, and a plurality of threaded elements mounted on said fitting in circumferentially spaced relation about the longitudinal axis thereof in engagement with said ring retaining the latter in its position of flexed engagement and hence said sealing ring means in its position of flexed engagement on the convex exterior pipe surface with a substantially uniform pressure throughout.

3. In a joint, a pipe having a convex cylindrical exterior surface, a fitting having an end secured to said pipe and an adjacent cylindrical portion extending outwardly from the convex exterior surface of said pipe, a ring of compressible packing material mounted on said portion, said packing ring being of substantially uniform cross-section and having inner annular surfaces forming a seal between the exterior surface of said cylindrical portion and the adjacent exterior surface of said pipe, a hollow ring-shaped carrier of deformable metal surrounding said packing ring and substantially confining the outer annulus thereof, and means for applying a substantially uniform pressure to said packing ring to flex the same and move the pipe-engaging surface thereof into conformed uniform pressure-tight sealing engagement with the convex exterior surface of said pipe, said pressure-applying means comprising a follower ring of flexible material mounted on said portion adjacent said carrier, and a plurality of threaded elements mounted on said fitting for engagement with said follower ring, said threaded elements being positioned to flex said follower ring so that the carrier-engaging surface thereof will assume a concave shape generally conforming to the convex shape of the pipe exterior.

4. A joint, a pipe having a convex cylindrical exterior surface, a fitting as defined in claim 3, wherein said follower ring is normally flat and is mounted on said fitting portion for free longitudinal movement with respect thereto.

5. A joint, a pipe having a convex cylindrical exterior surface, a fitting as defined in claim 3, wherein said fitting portion includes an annular flange extending radially outwardly from the end thereof opposite said first-mentioned end, said annular flange having a plurality of circumferentially spaced longitudinally extending apertures formed therein for threadably receiving said threaded elements.

6. A fitting comprising: a body having an end for securement to a pipe; sealing ring means of substantially uniform cross-section, said body having a cylindrical portion adjacent said end receiving said sealing ring means, said sealing ring means having an inner annular sealing surface facing in the direction of said body end, and a transverse abutment surface facing in the opposite direction; a follower ring of flexible material mounted on said body portion and having a transverse abutment surface for engagement with the transverse abutment surface of said sealing ring means; and means for moving the entire follower ring in engagement with said sealing ring means in the direction of said body end and for moving diametrically opposed portions of the transverse abutment surface of said follower ring in engagement with said sealing ring means a distance greater than the distance of movement of diametrically opposed portions of the transverse abutment surface of said follower ring disposed approximately one quadrant out of phase with said first mentioned diametrically opposed portions and for maintaining said follower ring against movement in the opposite direction.

References Cited in the file of this patent

UNITED STATES PATENTS

| | | | |
|---|---|---|---|
| 807,739 | Hanson | Dec. 19, | 1905 |
| 1,809,250 | Pendleton | June 9, | 1931 |
| 2,199,647 | Mueller et al. | May 7, | 1940 |
| 2,265,703 | Simpson | Dec. 9, | 1941 |
| 2,481,481 | Smith | Sept. 6, | 1949 |
| 2,756,486 | Smith | July 31, | 1956 |
| 2,833,572 | Moseley | May 6, | 1958 |
| 2,842,383 | Merrill | July 8, | 1958 |